United States Patent
Takayama et al.

(10) Patent No.: US 10,663,317 B2
(45) Date of Patent: May 26, 2020

(54) MAP DISPLAY SYSTEM AND MAP DISPLAY PROGRAM

(71) Applicants: AISIN AW CO., LTD., Anjo-shi, Aichi-ken (JP); TOYOTA JIDOSHA KABUSHIKI KAISHA, Toyota-shi, Aichi-ken (JP)

(72) Inventors: Shinji Takayama, Okazaki (JP); Toru Imai, Okazaki (JP); Kazunori Watanabe, Okazaki (JP)

(73) Assignees: AISIN AW CO., LTD., Anjo-shi, Aichi-ken (JP); TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 0 days.

(21) Appl. No.: 16/086,764

(22) PCT Filed: May 17, 2017

(86) PCT No.: PCT/JP2017/018504
§ 371 (c)(1),
(2) Date: Sep. 20, 2018

(87) PCT Pub. No.: WO2017/199997
PCT Pub. Date: Nov. 23, 2017

(65) Prior Publication Data
US 2019/0107412 A1  Apr. 11, 2019

(30) Foreign Application Priority Data
May 19, 2016  (JP) .................................. 2016-100324

(51) Int. Cl.
*G01C 21/00*  (2006.01)
*G01C 21/36*  (2006.01)
(Continued)

(52) U.S. Cl.
CPC ........... *G01C 21/367* (2013.01); *G01C 21/36* (2013.01); *G01C 21/3676* (2013.01);
(Continued)

(58) Field of Classification Search
CPC .. G01C 21/367; G01C 21/3676; G01C 21/36; G09B 29/00; G06F 3/0484; G06F 3/04883; G06T 3/20; G06T 3/40
See application file for complete search history.

(56) References Cited

U.S. PATENT DOCUMENTS

| | | | |
|---|---|---|---|
| 5,559,511 A * | 9/1996 | Ito ..................... | G01C 21/3415 340/460 |
| 5,877,751 A * | 3/1999 | Kanemitsu ......... | G01C 21/3611 340/438 |

(Continued)

FOREIGN PATENT DOCUMENTS

| | | |
|---|---|---|
| JP | 08-110755 A | 4/1996 |
| JP | 2004-117830 A | 4/2004 |

(Continued)

OTHER PUBLICATIONS

International Search Report of PCT/JP2017/018504 dated Aug. 15, 2017.

*Primary Examiner* — Martin Mushambo
(74) *Attorney, Agent, or Firm* — Sughrue Mion, PLLC

(57) ABSTRACT

Provided is a map display system including: a destination acquiring section which acquires a destination specified on a map displayed on the display section; a position acquiring section which acquires a starting position of the map when the destination is specified and an ending position of the map which allows a travel route to be displayed; and a display control section which displays so that the position on the display section gradually moves from the starting position to the ending position, acquires a starting scale of the map when the destination is specified and an ending scale of the map which allows display of the entire proposed travel route, and gradually changes a scale of the map displayed from the starting scale to the ending scale during movement, (Continued)

in which the position of the map displayed gradually moves from the starting position to the ending position.

8 Claims, 4 Drawing Sheets

(51) Int. Cl.
*G09B 29/00* (2006.01)
*G06F 3/0484* (2013.01)
*G06F 3/0488* (2013.01)
*G06T 3/20* (2006.01)
*G06T 3/40* (2006.01)

(52) U.S. Cl.
CPC .......... *G06F 3/0484* (2013.01); *G09B 29/00* (2013.01); *G06F 3/04883* (2013.01); *G06T 3/20* (2013.01); *G06T 3/40* (2013.01)

(56) References Cited

U.S. PATENT DOCUMENTS

| | | | | |
|---|---|---|---|---|
| 6,121,900 | A * | 9/2000 | Takishita | G01C 21/367 340/990 |
| 2007/0070090 | A1 * | 3/2007 | Debettencourt | G01C 21/3664 345/672 |
| 2008/0284795 | A1 * | 11/2008 | Ebert | G01C 21/367 345/619 |
| 2011/0025683 | A1 * | 2/2011 | Takagi | G01C 21/3694 345/418 |
| 2011/0109649 | A1 * | 5/2011 | Kumazawa | G01C 21/3694 345/629 |
| 2011/0242136 | A1 * | 10/2011 | Yamada | G01C 21/367 345/660 |
| 2014/0327703 | A1 * | 11/2014 | Arita | G01C 21/3667 345/637 |
| 2016/0078650 | A1 * | 3/2016 | Kishikawa | G09B 29/106 345/443 |
| 2017/0205885 | A1 * | 7/2017 | Schpok | G01C 21/26 |

FOREIGN PATENT DOCUMENTS

| | | |
|---|---|---|
| JP | 2008-209151 A | 9/2008 |
| JP | 2010-237076 A | 10/2010 |
| JP | 2013-114352 A | 6/2013 |

* cited by examiner

MAP DISPLAY SYSTEM AND MAP DISPLAY PROGRAM

CROSS REFERENCE TO RELATED APPLICATIONS

This application is a National Stage of International Application No. PCT/JP2017/018504 filed May 17, 2017, claiming priority based on Japanese Patent Application No. 2016-100324 filed May 19, 2016.

TECHNICAL FIELD

Aspects of the application relate to a map display system and a map display program.

BACKGROUND ART

There is a known technique for displaying an entire route to a destination after the destination is set see FIGS. 9 and 14 in Patent Document 1).

RELATED ART DOCUMENTS

Patent Documents

Patent Document 1: Japanese Patent Application Publication No. 8-110755 (JP H8-110755 A)

SUMMARY

Problem in the Related Art

In Patent Document 1, there has been a problem that it is difficult to recognize a positional relation of the destination and the route when a map that displays the destination suddenly transitions to a map that can display the entire route.

Aspects of the application were developed in view of the foregoing problem, and provide a technology that enables easier recognition of the positional relation of the destination and the route.

Means for Solving the Problem

According to one aspect, a map display system includes: a destination acquiring section which acquires a destination specified on a map displayed on a display section; a position acquiring section which acquires a starting position that is a position of the map when the destination is specified and an ending position that is a position of the map which allows an entire proposed travel route that connects a departure point and the destination to be displayed; and a display control section which controls the display section so that the position of the map displayed on the display section gradually moves from the starting position to the ending position. The display control section acquires a starting scale that is a scale of the map when the destination is specified and an ending scale that is a scale of the map which allows the entire proposed travel route to be displayed. Then, the display control section gradually changes a scale of the map displayed on the display section from the starting scale to the ending scale during a movement period, in which the position of the map displayed on the display section gradually moves from the starting position to the ending position.

According to another aspect, a map display program which causes a computer to function as: a destination acquiring section which acquires a destination specified on a map displayed on a display section; a position acquiring section which acquires a starting position that is a position of the map when the destination is specified and an ending position that is a position of the map which allows an entire proposed travel route that connects a departure point and the destination to be displayed; and a display control section which controls the display section so that the position of the map displayed on the display section gradually moves from the starting position to the ending position. The display control section acquires a starting scale that is a scale of the map when the destination is specified and an ending scale that is a scale of the map which allows the entire proposed travel route to be displayed. Then, the display control section gradually changes a scale of the map displayed on the display section from the starting scale to the ending scale during a movement period, in which the position of the map displayed on the display section gradually moves from the starting position to the ending position.

In the configuration described above, it can be said that the starting position is the position of the map in which the destination is displayed, since the starting position is the position of the map when the destination is specified. The map is gradually moved from the starting position to the ending position that is the position of the map in which the entire proposed travel route is displayed. Thus, it becomes easier to recognize the positional relation of the destination and the entire proposed travel route. That is, the map is gradually transitioned from a state in which the destination is displayed to a state in which the entire proposed travel route including the departure point is displayed. Thus, it becomes easier to recognize the positional relation of the destination and the proposed travel route due to the visual effects as if tracing back along the proposed travel route from the destination. Since the departure point that is a starting point of the proposed travel route is included in the proposed travel route, it becomes easier to recognize the positional relation of the destination and the departure point. It is possible to suppress the scale of the map from changing suddenly by gradually changing the scale of the map displayed on the display section from the starting scale to the ending scale, and the transition of the position of the map is easily understood.

DETAILED DESCRIPTION

Figure 1:
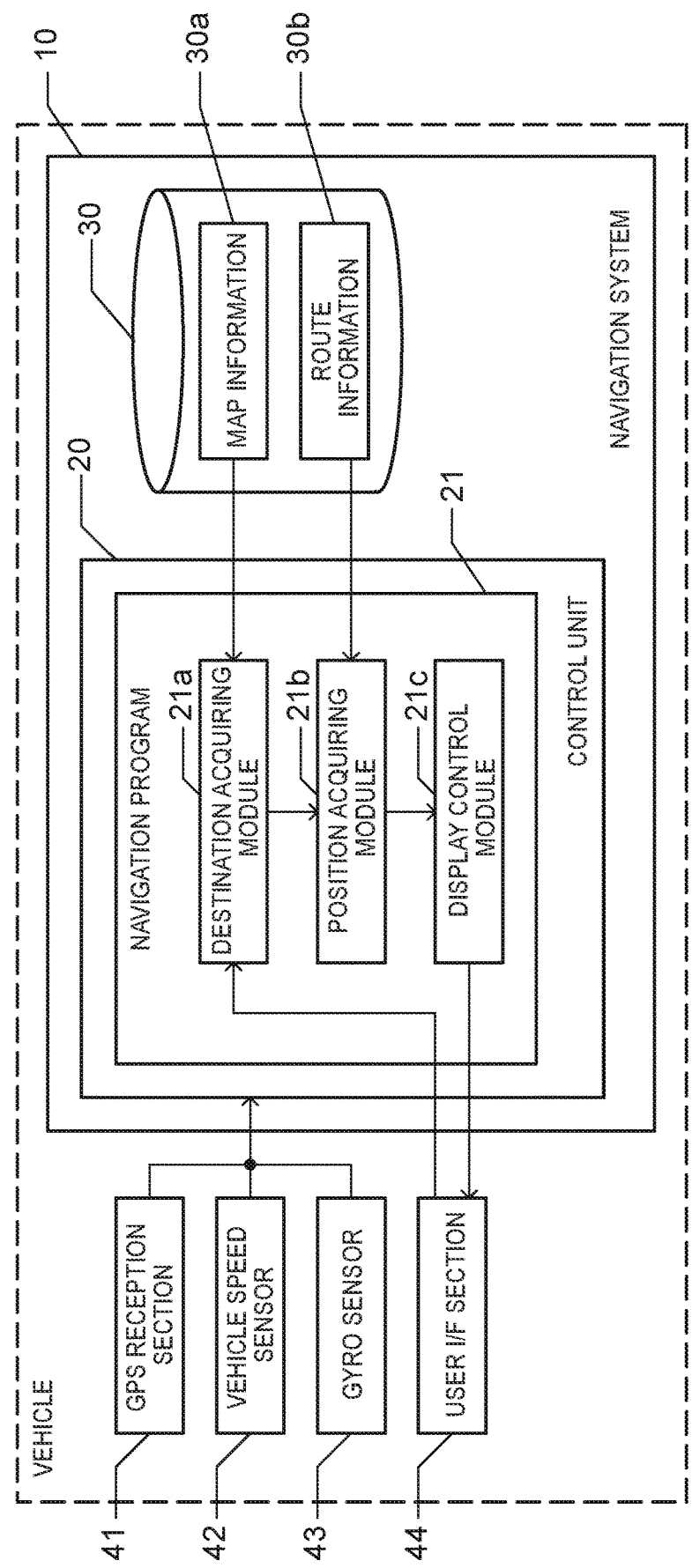
FIG. 1 is a block diagram of a navigation system.

Hereinafter, embodiments of the invention will be described in the following order:
(1) Configuration of Navigation System:
(2) Map Display Processing:
(3) Other Embodiments:
(1) Configuration of Navigation System:
FIG. 1 is a block diagram of the configuration of a navigation system 10 serving as a map display system according to an embodiment. The navigation system 10 is installed in a vehicle. The navigation system 10 has a control unit 20 and a recording medium 30. The control unit 20 has a CPU, a RAM, a ROM etc. and executes a navigation program 21 recorded in the recording medium 30 or the ROM.

The recording medium 30 records map information 30a and route information 30b. The map information 30a includes link data which identifies links that connect two nodes, and node data of positions of the nodes etc. The links correspond to road sections on which the vehicle can travel. The nodes correspond to intersections that are endpoints of the links in the longitudinal direction of the links. The node data indicate positions of the intersections corresponding to the nodes. The link data includes shape interpolation point data that indicate positions of shape interpolation points set in the middle of the links in their width direction. The route information 30b is information that indicates a proposed travel route which connects a departure point and a destination. Specifically, the route information 30b is information that represents a series of links that define the proposed travel route.

The vehicle has a GPS reception section 41, a vehicle speed sensor 42, a gyro sensor 43, and a user I/F section 44. The GPS reception section 41 receives radio waves from a GPS satellite and outputs signals for computing the current location of the vehicle via an interface not shown. The vehicle speed sensor 42 outputs signals corresponding to a rotational speed of wheels of the vehicle. The control unit 20 acquires a vehicle speed based on signals from the vehicle speed sensor 42. The gyro sensor 43 detects an angular acceleration when the vehicle turns within a horizontal plane and outputs signals corresponding to a direction in which the vehicle is headed. The control unit 20 acquires the traveling direction of the vehicle based on the signals from the gyro sensor 43. The control unit 20 acquires the current location of the vehicle by identifying a traveling path of the vehicle based on the signals output from the vehicle speed sensor 42 and the gyro sensor 43 etc. Signals output from the GPS reception section 41 are used for correcting the current location of the vehicle identified by the vehicle speed sensor 42 and the gyro sensor 43 etc.

The user I/F section 44 is an interface section for providing a user with various kinds of information and for receiving commands from the user. The user I/P section 44 has a touch panel display and a speaker that outputs sound, not shown, in the embodiment. The touch panel display is an example of a display section and displays a map. The control unit 20 outputs control signals to the user I/F section 44 to display images and to output sounds from the speaker. The control unit 20 acquires the user's preferences based on touch operation on the touch panel display serving as an input section.

The navigation program 21 corresponds to a map display program. The navigation program 21 includes a destination acquiring module 21a, a position acquiring module 21b, and a display control module 21c. The destination acquiring module 21a, the position acquiring module 21b, and the display control module 21c are program modules that cause the control unit 20 serving as a computer to function as a destination acquiring section, a position acquiring section, and a display control section.

With a function of the destination acquiring module 21a, the control unit 20 acquires a destination specified on the map displayed in the display section. Specifically, with the function of the destination acquiring module 21a, the control unit 20 displays a map for specifying the destination in a map display region provided on the touch panel display.

Figure 2A:
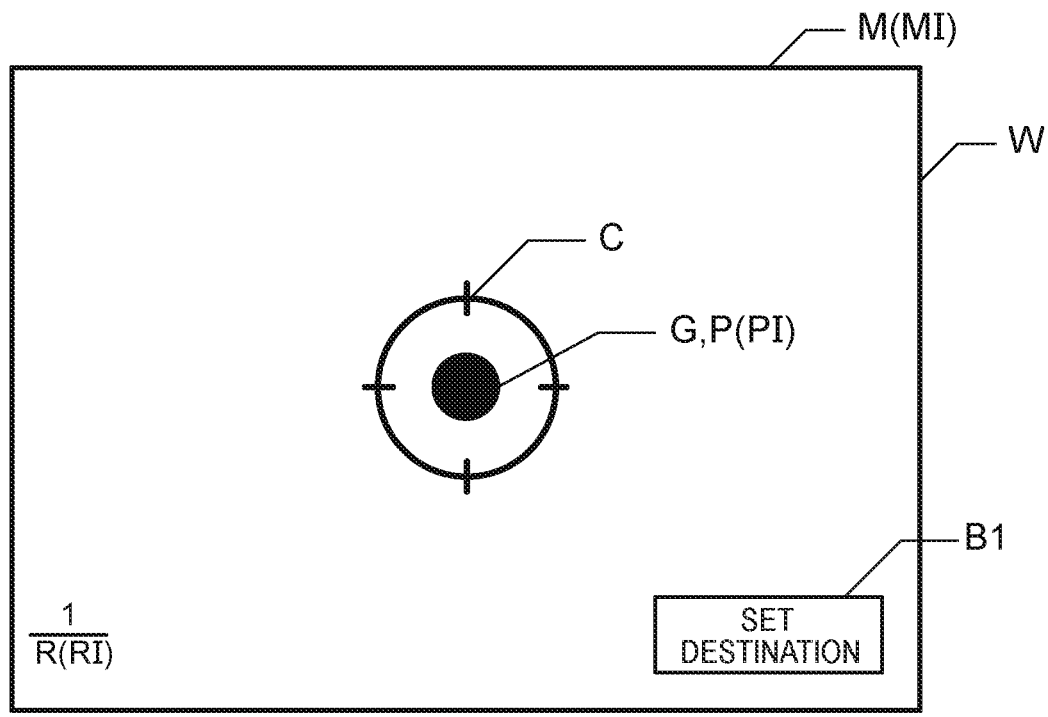
FIGS. 2A and 2B are examples of a map.

FIG. 2A is an example of the map for specifying the destination. As shown in FIG. 2A, a map M is displayed in a map display region W. The map display region W may fill the entire touch panel display or only a portion thereof. In the map display region W, the control unit 20 displays the map M, a destination setting button B1, and a cursor C. The map M is a map on a scale of 1/R. Here, a reference position P is a position shown at a centroid position of the map display region W of the map M. The control unit 20 receives touch operation in the map display region W (drag-and-drop operation, flick operation, pinch-in operation, and pinch-out operation etc.) and sets the reference position P and the scale of 1/R according to the touch operation. The control unit 20 acquires information on features (links, nodes, and facilities etc.) displayed in the map display region W according to the reference position P and the scale of 1/R from the map information 30a and draws the map M based on the acquired information. When the control unit 20 receives touch operation (tap operation, double-tap operation, and long-press operation etc.) on the destination setting button B1, the control unit 20 acquires the reference position P of when touch operation is received, as a destination G specified by the user.

With a function of the position acquiring module 21b, the control unit 20 acquires a starting position PI and a starting scale. The starting position PI is a position of the map M when the destination G is specified. The starting scale is a scale of 1/R of the map M when the destination G is specified. With the function of the position acquiring module 21b, the control unit 20 acquires the reference position P of a starting map MI that is the map M when the destination G is specified (when touch operation to the destination setting button B1 is received), as the starting position PI. The control unit 20 acquires the scale of 1/R of the starting map MI as a starting scale of 1/RI. In the embodiment, the starting position PI and the destination G are in the same position. When the control unit 20 acquires a position on which the user performs touch operation as the destination G etc., the starting position PI and the destination G may be in different positions. Additionally, the reference position P does not need to be the position indicated by the centroid position of the map display region W.

With the function of the position acquiring module 21b, the control unit 20 acquires as the departure point a current location of the vehicle when the destination G is specified and retrieves the optimum proposed travel route from the departure point to the destination G based on the map information 30a. The retrieval method of the proposed travel route may be any method. For example, a known method such as Dijkstra's method may be applied. With the function of the position acquiring module 21b, the control unit 20 records in the recording medium 30, the route information 30b that indicate the series of links that define the retrieved proposed travel route.

With the function of the position acquiring module 21b, the control unit 20 acquires an ending position and an ending scale. The ending position is the reference position P of the map M in which the entire proposed travel route that connects the departure point and the destination G can be displayed. The ending scale is the scale of 1/R of the map M in which the entire proposed travel route can be displayed. With the function of the position acquiring module 21b, the control unit 20 acquires the links that define the proposed travel route, the departure point, and the destination G, from the route information 30b, and acquires as the ending position a middle point of a straight line that connects the departure point and the destination G. That is, the control unit 20 acquires as the ending position the position of a middle point of the departure point and the destination G.

When the map M of which the ending position is the reference position P is displayed, the control unit 20 also acquires as the ending scale the maximum scale of 1/R in which the entire proposed travel route can be displayed in the map M (the scale of 1/R in which the map M is the most detailed) out of the scales of 1/R that can be set. In the embodiment, the scale of 1/R that can be set is a discrete value such as 1/2,500, 1/5,000, 1/10,000, 1/20,000, 1/40,000, 1/80,000, and 1/160,000 etc. When the entire proposed travel route can be displayed, it means that all the links that define the proposed travel route can be displayed.

Figure 2B:
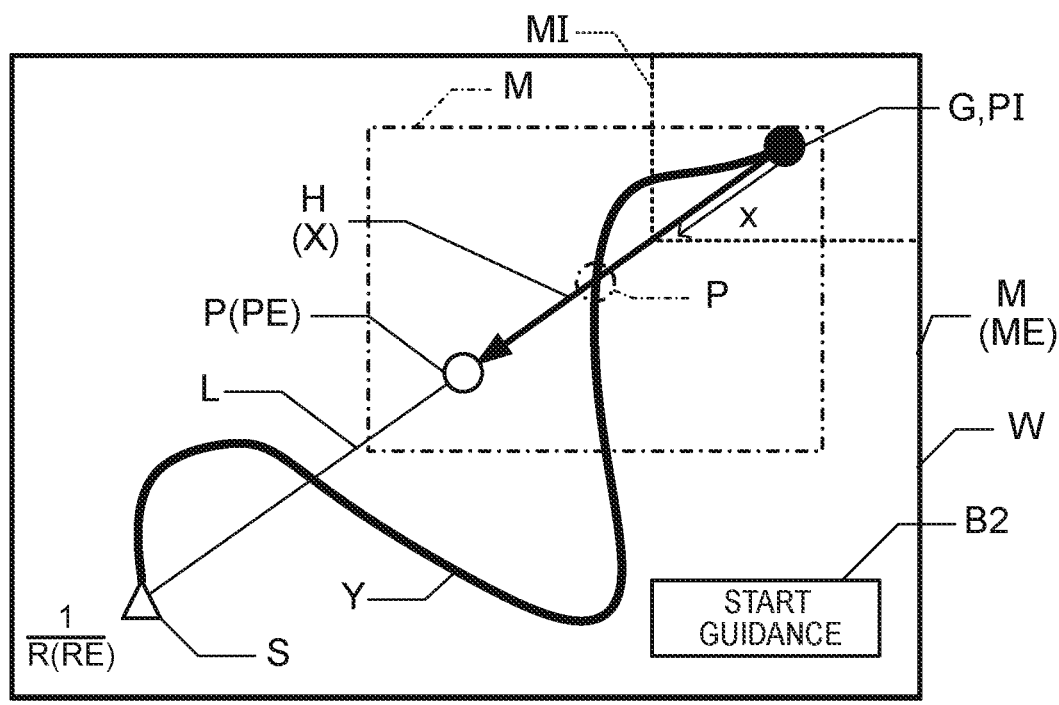

FIG. 2B is an example of a map for explaining an ending position PE. As shown in FIG. 2B, the ending position PE is a middle point of a straight line L that connects a departure point S and the destination G. For example, in the case where an ending map ME that is the map M of which the ending position PE is the reference position P is drawn, a part of the links of a proposed travel route Y may be positioned outside the ending map ME when the scale of 1/R is 1/10,000 and all the links of the proposed travel route Y may be displayed in the ending map ME when the scale of 1/R is 1/20,000. In this case, the scale of 1/20,000 is acquired as the ending scale of 1/R. In the embodiment, the map M is displayed so that an upper portion of the map display region W always indicates north. Here, the ending position PE does not necessarily have to be the middle point of the straight line L that connects the departure point S and the destination G. For example, the control unit 20 may acquire as the ending position PE, the centroid position of a rectangle that is similar to the map display region W and that is circumscribed to the proposed travel route Y. The control unit 20 may also acquire as the ending position PE, a position on the proposed travel route Y, to which a distance from the departure point S on the proposed travel route Y and a distance from the destination G on the proposed travel route Y are equal. In this case, the control unit 20 may move the reference position P along the proposed travel route Y.

With a function of the display control module 21c, the control unit 20 controls the display section so that the reference position P of the map M displayed on the display section is gradually moved from the starting position PI to the ending position PE. A period in which the position of the map M is gradually moved from the starting position PI to the ending position PE is herein defined as a movement period. The control unit 20 sets the reference position P at a starting time of the movement period as the starting position PI, and sets the reference position P at an ending time of the movement period as the ending position PE. The control unit 20 also sets the reference position P at a time of the movement period other than the starting time and the ending time, along a line of movement H which is a straight line that connects the starting position PI and the ending position PE (at a position other than the starting position PI and the ending position PE). Specifically, the control unit 20 sets the reference position P to a position along the line of movement H that is nearer to the ending position PE, as the time becomes nearer to the ending time of the movement period.

Figure 3A:
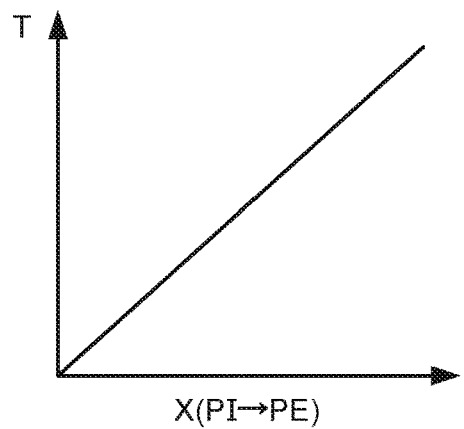
FIGS. 3A and 3B are graphs of a movement period and FIGS. 3C and 3D are graphs of speed.

With the function of the display control module 21c, the control unit 20 sets the length of the movement period in which the reference position P of the map M displayed on the display section is gradually moved from the starting position PI to the ending position PE, so that the longer an ending distance X which is a distance from the starting position PI to the ending position PE, the longer the movement period is. FIG. 3A is a graph of a relationship between the ending distance X which is the distance from the starting position PI to the ending position PE, and a movement period T. The control unit 20 acquires the movement period T based on a monotone increasing function of the ending distance X. The monotone increasing function may be a proportional function as in FIG. 3A or may be a different function (linear or nonlinear).

Figure 3B:
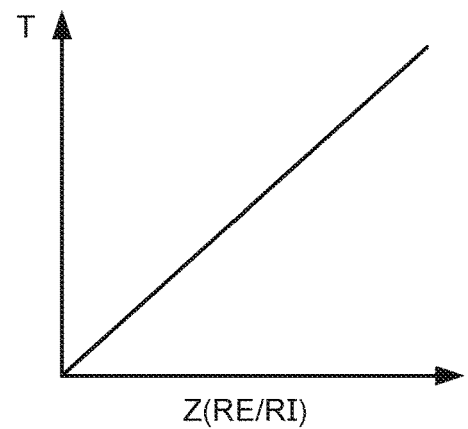

With the function of the display control module 21c, the control unit 20 sets the length of the movement period T in which the reference position P of the map M displayed on the display section is gradually moved front the starting position PI to the ending position PE, so that the larger the difference is between the starting scale of 1/RI and the ending scale of 1/RE, the longer the movement period T is. FIG. 3B is a graph of a relationship between an ending ratio Z which is a ratio of the ending scale of 1/RE to the starting scale of 1/RI, and the movement period T. The ending ratio Z is a value obtained by dividing a scale denominator RE of the ending scale of 1/RE by a scale denominator RI of the starting scale of 1/RI. Thus, the ending ratio Z is RE/RI. For example, if the ending scale of 1/RE is 1/10,000 and the starting scale of 1/RI is 1/2,500, the ending ratio Z is 4/1. The ending ratio Z is the value obtained by dividing a length of a real space corresponding to a certain distance (for example, 1 cm) on the ending map ME by a length of a real space corresponding to the certain distance on the starting map MI. The control unit 20 acquires the movement period T based on the monotone increasing function of the ending ratio Z. The monotone increasing function may be a proportional function as in FIG. 3B or may be a different function (linear or nonlinear).

With the function of the display control module 21c, the control unit 20 selects as the length of the movement period T, the longer one of the length of the movement period T acquired based on the ending distance X and the length of the movement period T acquired based on the ending ratio Z. Thus, the possibility that the movement period T which is too short for the ending distance X or the ending ratio Z is set, can be reduced.

With the function of the display control module 21c, the control unit 20 increases a moving speed of the map M in a starting part of the movement period T, in which the reference position P of the map M displayed on the display section is gradually moved from the starting position PI to the ending position PE. With the function of the display control module 21c, the control unit 20 gradually decreases the moving speed of the map M in a last part of the movement period T, in which the reference position P of the map M displayed on the display section is gradually moved from the starting position PI to the ending position PE.

Figure 3C:
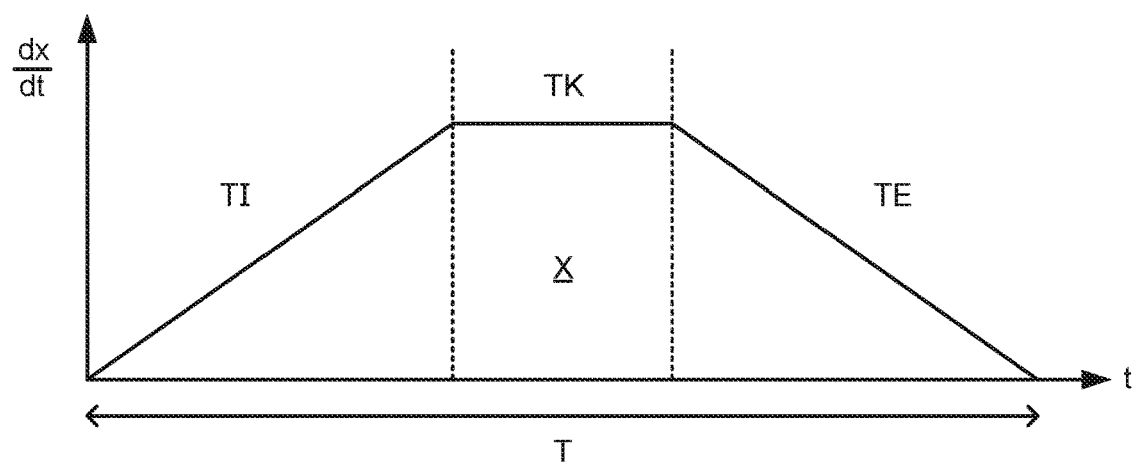

FIG. 3C is a graph of a relationship between a time t during the movement period T and a moving speed dx/dt of the reference position P of the map M along the line of movement H. A distance x is a distance from the starting position PI to any reference position P along the line of movement H. The control unit 20 divides the movement period T into three parts: a starting period TI: an intermediate period TK; and an ending period TE. The control unit 20 monotonically increases the speed dx/dt during the starting period TI that is the starting part of the movement period T. The control unit 20 monotonically decreases the speed dx/dt during the ending period TE that is the last part of the movement period T. The control unit 20 keeps the speed dx/dt constant during the intermediate period TK. The speed dx/dt does not necessarily have to be linearly monotonically increased or decreased, and may be nonlinearly monotonically increased or decreased.

The control unit 20 sets the value of the speed dx/dt to be larger as the ending distance X becomes larger. The control unit 20 may set the starting period TI, the intermediate period TK, and the ending period TE so that the intermediate period TK becomes longer as the ending distance X and the ending ratio Z become larger. The control unit 20 uses definite integration of the speed dx/dt from the starting time (t=0) to a time t during the movement period T to acquire the distance x (refermece position P) at the time t.

With the function of the display control module 21c, the control unit 20 gradually changes the scale of 1/R of the map M displayed on the display section from the starting scale of 1/RI to the ending scale of 1/RE during the movement period T, in which the reference position P of the map M displayed on the display section is gradually moved from the starting position PI to the ending position PE. That is, the control unit 20 sets the scale denominator R at a time during the movement period T other than the starting time and the ending time to a value between the scale denominator RI of the starting scale of 1/RI and the scale denominator RE of the ending scale of 1/RE. Specifically, the control unit 20 sets the scale denominator R to a value that is nearer to the scale denominator RE of the ending scale of 1/RE, as the time becomes nearer to the ending time of the movement period.

Specifically, with the function of the display control module 21c, the control unit 20 gradually increases the changing speed of the scale of 1/R of the map M during the starting part of the movement period T, in which the reference, position P of the map M displayed on the display section is gradually moved from the starting position PI to the ending position PE. With the function of the display control module 21c, the control unit 20 gradually decreases the changing speed of the scale of 1/R of the map M in a last part of the movement period T, in which the reference position P of the map M displayed on the display section is gradually moved from the starting position PI to the ending position PE.

Figure 3D:
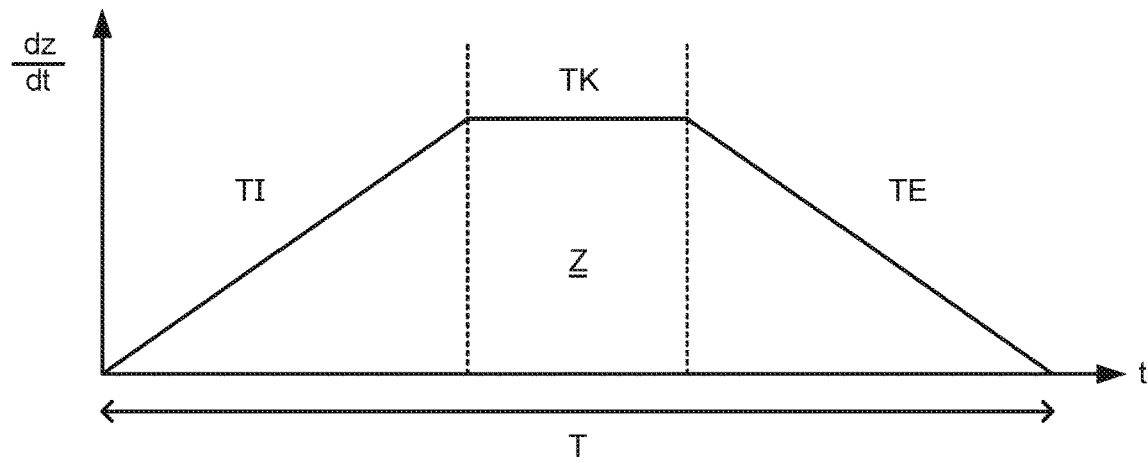
Figure 4:
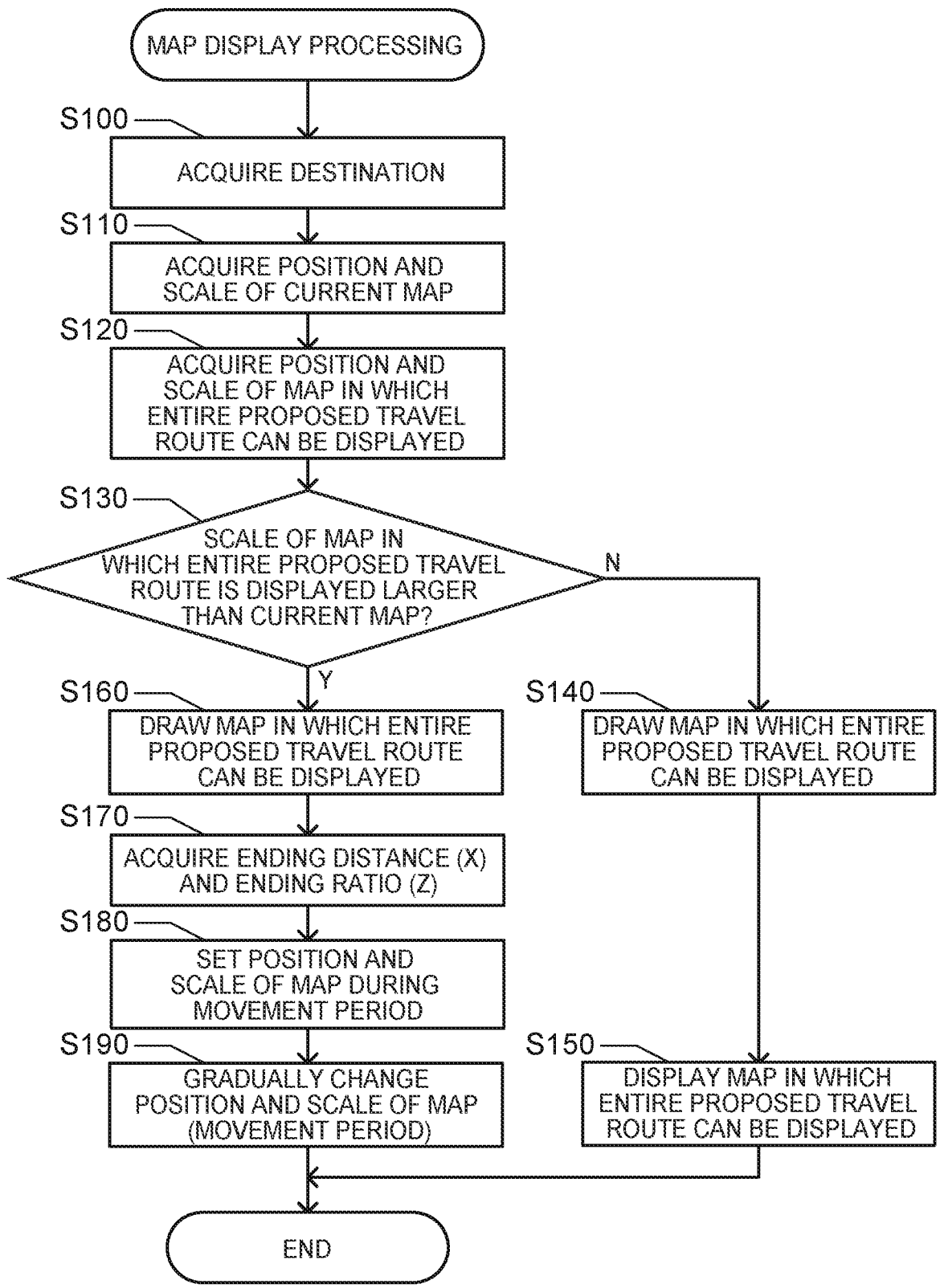
FIG. 4 is a flowchart of map display processing.

FIG. 3D is a graph of a relationship between the time t during the movement period T and a speed dz/dt at which a ratio z of the scale of 1/R of the map M varies. The ratio z is a value obtained by dividing the scale denominator R of the scale of 1/R of the map M at a time t by the scale denominator RI of the starting scale of 1/RI. Thus, the ratio z is R/RI. The control unit 20 monotonically increases the speed dz/dt during the starting period TI, keeps the speed dz/dt constant during the intermediate period TK, and monotonically decreases the speed dz/dt during the ending period TE. The speed dz/dt does not necessarily have to be linearly monotonically increased or decreased, and may be nonlinearly monotonically increased or decreased.

The control unit 20 sets the value of the speed dz/dt during the intermediate period TK to be larger as the ending ratio Z is larger. The control unit 20 uses definite integration of the speed dx/dt from the starting time (t=0) to a time t during the movement period T to acquire the ratio z at the time t. The control unit 20 acquires the scale of 1/R (R=z*RI) at a time t based on the ratio z at the time t, and displays the map M with a scale of 1/R (discrete value) nearest to the scale of 1/R.

Thus, it is possible to display the starting map MI in which the destination G is easily seen at the starting time during the movement period T, and gradually move the reference position P of the map M to the reference position P (ending position PE) of the ending map ME in which the entire proposed travel route Y can be displayed, while gradually making the scale of 1/R smaller (while expanding the map M). That is, at the time t between the starting time during the movement period T, at which the starting map MI shown by a broken line in FIG. 2B is displayed, and the ending time during the movement period T, at which the ending map ME shown by a solid line is displayed, the reference position P is the position between the starting position PI and the ending position PE as shown by a long dashed short dashed line, and the map M with the scale of 1/R that is between the starting scale of 1/RI and the ending scale of 1/RE is displayed.

In the configuration of the embodiment described above, it can be said that the starting position PI is the position of the map M in which the destination G is displayed, since the starting position PI is the reference position P of the starting map MI when the destination G is specified. The map M is gradually moved from the starting position PI to the ending position PE that is the position of the ending map ME in which the entire proposed travel route Y is displayed. Thus, it becomes easier to recognize the positional relation of the destination G and the entire proposed travel route Y. That is, the map M is gradually transitioned from a state in which the destination G is displayed to a state in which the entire proposed travel route including the departure point S is displayed. Thus, it becomes easier to recognize the positional relation of the destination G and the proposed travel route Y due to the visual effects as if tracing back along the proposed travel route Y from the destination G. Since the departure point S that is a starting point of the proposed travel route Y is included in the entire proposed travel route Y, it becomes easier to recognize the positional relation of the destination G and the departure point S.

The map can be slowly moved from the starting position PI to the ending position PE by making the movement period T longer when the ending distance X over which the map moves from the starting position PI to the ending position PE becomes longer. Thus, the transition of the position of the map M is easily understood, and the positional relation of the destination G and the proposed travel route Y becomes easier to recognize.

In the starting period TI at the start of the movement period T, the moving speed dx/dt of the map M is gradually increased. Thus, it is possible to suppress the movement of the map M from starting suddenly and easily understand the transition of the position of the map M. In the ending period TE at the end of the movement period T, it is possible to intuitively r that the movement of the map M is terminated, by gradually decreasing the moving speed dx/dt of the map M. Additionally, it is possible to reduce the possibility that a sense of discomfort occurs when the moving map M is suddenly stopped.

In the movement period T, the scale of 1/R of the map M displayed on the display section is gradually changed from the starting scale of 1/RI to the ending scale of 1/RE. Thus, it is possible to suppress the scale of 1/R of the map M from changing suddenly and easily understand the transition of the position of the map M. When the scale of 1/R of the map M is changed suddenly, the possibility that the transition of the position of the map M cannot be easily recognized increases, even when the reference position P of the map M is not suddenly moved.

The length of the movement period T is set so that the larger the difference is between the starting scale of 1/RI and the ending scale of 1/RE, the longer the movement period T is. Thus, it is possible to suppress the scale of 1/R of the map M from changing suddenly and easily understand the transition of the position of the map M.

In the starting period TI at the start of the movement period T, the changing speed of the scale of 1/R of the map M is gradually increased. Thus, it is possible to suppress the scale of 1/R of the map M from changing and easily understand the transition of the position of the map M. In the last part of the movement period T, the changing speed of the scale of 1/R of the map M gradually decreases. In this configuration, noticing that the rate of change of the scale of 1/R of the map M is decreasing makes it possible to intuitively realize that the movement of the map M will end. Additionally, it is possible to reduce the possibility that a sense of discomfort occurs due to the change of the scale of 1/R of the map M stopping suddenly.

(2) Map Display Processing:

Next, the map display processing executed by the control unit 20 with a function of the navigation program 21 will be described. The map display processing of the embodiment is a process that is executed when the destination setting button B1 is operated when the starting map MI of the FIG. 2A is displayed.

First, with the function of the destination acquiring module 21a, the control unit 20 acquires the destination G (step S100). Specifically, when the control unit 20 receives touch operation to the destination setting button B1, the control unit 20 acquires the reference position P of the map M when touch operation is received, as the destination G specified by the user. That is, the control unit 20 acquires the reference position P of the starting map MI which is the map M when the destination G is specified, as the destination G.

Next, with the function of the position acquiring module 21b, the control unit 20 acquires the position and the scale of 1/R of the current map M (step S110). That is, the control unit 20 acquires the starting position PI (=destination G) which is the reference position P of the starting map MI and the starting scale of 1/RI which is the scale of 1/R of the starting map MI.

With the function of the position acquiring module 21b, the control unit 20 then acquires the position and the scale of 1/R of the map M in which the entire proposed travel route Y can be displayed (step S120). That is, the control unit 20 acquires the ending position PE which is the reference position P of the ending map ME and the ending scale of 1/RE which is the scale of 1/R of the ending map ME. The ending map ME is the map M in which the entire proposed travel route Y can be displayed. In the embodiment, the ending position PE is the position of the middle point of the straight line L that connects the departure point S and the destination G. In the embodiment, when the map M is displayed, in which the ending position PE is the reference position P, the ending scale of 1/RE is the maximum scale of 1/R (discrete value of the scale of 1/R in which the map M is the most detailed) in which the entire proposed travel route Y can be displayed in the map M.

Next, with the function of the display control module 21c, the control unit 20 determines whether the scale of the map M in which the entire proposed travel route Y can be displayed is larger than the current map M (step S130). That is, the control unit 20 determines whether the ending scale of 1/RE which is the scale of 1/R of the ending map ME is larger than the starting scale of 1/RI which is the scale of 1/R of the starting map MI. Thus, the control unit 20 determines whether the map M should expand (be zoomed out) when a state in which the starting map MI is displayed is switched to a state in which the ending map ME is displayed. Although not shown, during a period between step S100 and step S120, the control unit 20 retrieves the proposed travel route Y which connects the departure point S (current location of the vehicle) and the destination G.

If the control unit 20 does not determine that the scale of 1/R of the map M, in which the entire proposed travel route Y can be displayed, is larger than that of the current map M (step S130: N), the control unit 20 draws a map M in which the entire proposed travel route Y can be displayed, with the function of the display control nodule 21c (step S140). That is, the control unit 20 draws the ending map ME.

With the function of the display control module 21c, the control unit 20 displays the map M in which the entire proposed travel route Y can be displayed (step S150). That is, by displaying the ending map ME on the touch panel display serving as the display section, the control unit 20 switches the state in which the starting map MI is displayed to the state in which the ending map ME is displayed (without gradually moving the reference position P). Here, the case in which the ending scale of 1/RE which is the scale of 1/R of the ending map ME is not larger than the starting scale of 1/RI which is the scale of 1/R of the starting map MI (step S130: N) is the case in which the map M becomes detailed (is zoomed in) when the control unit 20 switches the state in which the starting map MI is displayed to the state in which the ending map ME is displayed. That is, the possibility that the entire proposed travel route Y can be displayed is high in the starting map MI, and even if the control unit 20 suddenly switches the state in which the starting map MI is displayed to the state in which the ending map ME is displayed, the positional relation of the destination G and the proposed travel route Y can be easily recognized. Thus, it is possible to omit the process of gradually moving the reference position P of the map M during the movement period T.

If the control unit 20 determines that the scale 1/R of the map M, in which the entire proposed travel route Y can be displayed, is larger than that of the current map M (step S130: Y), the control unit 20 draws a map M, in which the entire proposed travel route Y can be displayed, with the function of the display control module 21c (step S160). That is, the control unit 20 draws the ending map ME as in step S140.

With the function of the display control module 21c, the control unit 20 acquires the ending distance X and the ending ratio Z (step S170). That is, the control unit 20 acquires the ending distance X which is the distance between the starting position PI (=destination G) that is the reference position P of the starting map MI and the ending position PE that is the reference position P of the ending map ME. The control unit 20 also acquires, as the ending ratio Z, a value obtained by dividing the starting scale of 1/RI that is the scale of 1/R of the starting map MI by the ending scale of 1/RE that is the scale of 1/R of the ending map ME (RE/RI). Since it is determined in step S130 that the ending scale of 1/RE is less detailed than the starting map MI, the scale denominator RI of the starting map MI is equal to or less than the scale denominator RE of the ending map ME and the ending ratio Z (=RE/RI) is equal to or more than 1/1.

With the function of the display control module 21c, the control unit 20 sets the position and the scale of 1/R of the map M during the movement period T (step S180). Here, as shown in FIGS. 3A and 3B, the control unit 20 sets the movement period T to be longer as the ending distance X and the ending ratio Z becomes larger. The control unit 20 sets the reference position P and the scale of 1/R of the map M at each time t during the movement period T. As shown specifically in FIGS. 3C and 3D, the control unit 20 divides the movement period T into three parts: the starting period TI; the intermediate period TK; and the ending period TE. During the starting period TI, the control unit 20 monotonically increases the speeds dx/dt and dz/dt at which the reference position P and the ratio z of the scale of 1/R vary.

During the intermediate period TK, the control unit 20 keeps the speeds dx/dt and dz/dt constant. In the ending period TE, the control unit 20 monotonically decreases the speed dx/dt and dz/dt.

With the function of the display control module 21c, the control unit 20 gradually moves the position and the scale of 1/R of the map M (step S190). That is, the control unit 20 sets the reference position P and the scale of 1/R of the map M at each time t based on the speeds dx/dt and dz/dt at each time t set in step S180. Thus, during the movement period T, the control unit 20 controls the touch panel display serving as the display section so that the reference position P is gradually moved from the starting position PI to the ending position PE and the scale of 1/R of the map M gradually changes from the starting scale of 1/RI to the ending scale of 1/RE.

In the embodiment, the control unit 20 draws the ending map ME, in which the entire proposed travel route Y can be displayed, in advance (step S160) and produces the map M at each time t by cutting out a part of the ending map ME. That is, the control unit 20 sets the position and size of a region to be cut out from the ending map ME based on the reference position P and the ratio z set at each time t. Thus, the control unit 20 produces the map M at each time t (the map M within the long dashed short dashed line in FIG. 2B etc.) and outputs display data of the map M to the touch panel display. The control unit 20 may draw at each time t the map M corresponding to the ratio z and the reference position P at the time t.

In step S190, in the end, the ending map ME is displayed as in step S150. As shown in FIG. 2B, the control unit 20 causes the touch panel display to display a guidance start button B2 as well as the ending map ME. When the guidance start button B2 is operated, the control unit 20 executes guidance of the proposed travel route Y.

(3) Other Embodiments:

In the embodiment, the length of the movement period T is set based on the ending distance X that is the distance from the starting position PI to the ending position PE. However, the length of the movement period T may be independent of the ending distance X. Similarly, the length of the movement period T may be independent of the ending ratio Z. The length of the movement period T may be dependent only on the ending distance X, or may be dependent only on the ending ratio Z. The length of the movement period T may be set to a predetermined constant length, or may be set to a length set by the user. The length of the movement period T may be set to be longer as the route length of the proposed travel route Y becomes longer.

The movement period T does not necessarily have to be divided into the starting period TI, the intermediate, period TK, and the ending period TE. Either one of the starting period TI and the ending period TE does not need to be provided. That is, the movement period T may be configured of only the starting period TI and the intermediate period TK. In the starting period TI, the speeds dx/dt and dz/dt, at which the reference position P and the ratio z of the scale of 1/R vary, are monotonically increased. In the intermediate period TK, the speeds dx/dt and dz/dt are kept constant. The movement period T may also be configured of only the intermediate period TK and the ending period TE. In the intermediate period TK, the speeds dx/dt and dz/dt, at which the reference position P and the ratio z of the scale of 1/R vary, are kept constant. In the ending period TE, the speeds dx/dt and dz/dt are monotonically decreased. Additionally, the movement period T may be configured of only the starting period TI and the ending period TE. In the starting period TI, the speeds dx/dt and dz/dt, at which the reference position P and the ratio z of the scale of 1/R vary, are monotonically increased. In the ending period TE, the speeds dx/dt and dz/dt are monotonically decreased.

Throughout the entire movement period T, the speeds dx/dt and dz/dt, at which the reference position P and the ratio z of the scale of 1/R vary, may be monotonically increased, may be kept constant, or may be monotonically decreased. The speeds dx/dt and dz/dt, at which the reference position P and the ratio z of the scale of 1/R vary, may be defined by a nonlinear function that is curved to be convex upward throughout the entire movement period T. The speed dx/dt that varies with the reference position P and the speed dz/dt at which the ratio z of the scale of 1/R varies do not need to have a common starting period TI, intermediate period TK, and ending period TE. For example, the speed dx/dt that varies with the reference position P may be set according to the starting period TI, the intermediate period TK, and the ending period TE. The speed dz/dt at which the ratio z of the scale of 1/R varies may be set to be constant throughout the entire movement period T.

The reference position P of the map M may be gradually moved during the movement period T, even when the map M becomes detailed (zoomed in) when the state in which the starting map MI is displayed is switched to the state in which the ending map ME is displayed. Even in such a case, it is possible to prevent the map M from being switched suddenly and thus reduce a sense of discomfort imparted to the driver.

At the very least, the it is desirable that the embodiments be minimally configured to gradually move the reference position P of the map M during the movement period T. Thus, the control unit 20 may gradually move the reference position P of the map M while keeping the starting scale of 1/RI of the starting map MI, and switch the scale of 1/R of the map M from the starting scale of 1/RI to the ending scale of 1/RE when the reference position P is moved to the ending position PE. The control unit 20 may first switch the scale of 1/R of the map M from the starting scale of 1/RI to the ending scale of 1/RE and then gradually move the reference position P of the map M to the ending position PE.

According to another aspect, the map display system may be an on-board device provided in the vehicle or may be a device not provided in the vehicle. The display section may be included in the map display system or may be provided on a device that can communicate with the map display system. The destination acquiring section only needs to acquire the destination specified on the map and may acquire as the destination a position corresponding to a position on the map on which the user performs operation. The position on which the user performs operation may be a position on the touch panel display, on which a map is displayed, that the user touched with their finger. The position on which the user performs operation may be a position of a cursor on the map, and the operation of the user in which the cursor and the map are relatively moved (cursor is moved or map is scrolled) may be received at the position. In both cases, the starting position is the position of the map in which the destination is displayed on the map since the destination is specified after the user has visually confirmed the destination on the map.

The position of the map such as the starting position and the ending position may be a position indicated by a specific position of the display section out of the positions on the map, for example. The specific position may be a middle position or a position of one of four corners of the map display region in which the map is displayed on the display section.

The destination is a final destination of the proposed travel route. Other than the destination, a transit point may be set midway of the proposed travel route. The departure point may be a current position of the vehicle or the user, or may be a position set by the user. The proposed travel route is a route that connects the departure point and the destination. The proposed travel route may be a route retrieved at least after the destination has been set. When the entire proposed travel route is displayed, all parts that define the proposed travel route may be displayed or the departure point and the destination may be displayed. The single proposed travel route or a plurality of the proposed travel routes may be provided. If there is a plurality of the proposed travel routes, a position of the map in which all the proposed travel routes are entirely displayed is the ending position.

The display control section only needs to control the display section so that the position of the map is gradually moved from the starting position to the ending position. The display control section may control the display section so that the position of the map moves in stages, along the line of movement that connects the starting position and the ending position. The line of movement may be a straight line that connects the starting position and the ending position, a curved line that connects the starting position and the ending position, the proposed travel route, or a line formed along the proposed travel route. When the position of the map moves in stages, it means that the position of the map moves via at least one relay position along the line of movement which is between the starting position and the ending position. As the number of the relay positions through which the position of the map passes is increased, the position of the map can be moved more smoothly.

The display control section may set the length of the movement period, in which the position of the map displayed on the display section is gradually moved from the starting position to the ending position, so that the longer the distance is from the starting position to the ending position, the longer the movement period is. In this way, the map can be slowly moved from the starting position to the ending position by increasing the length of the movement period when the distance over which the position of the map moves from the starting position to the ending position is long. Thus, the transition of the position of the map is easily understood, and the positional relation of the destination and the proposed travel route becomes easier to recognize. The length of the movement period only needs to be monotonically increased according to the distance from the starting position to the ending position, and may become longer linearly or longer nonlinearly.

In the starting part of the movement period, in which the position of the map displayed on the display section is gradually moved from the starting position to the ending position, the display control section may gradually increase the speed at which the map is moved. Thus, it is possible to suppress the movement of the map from starting suddenly and the transition of the position of the map is easily understood.

In the last part of the movement period, in which the position of the map displayed on the display section is gradually moved from the starting position to the ending position, the display control section may gradually decrease the speed at which the map is moved. In such a configuration, noticing that the speed at which the map moves is gradually decreasing makes it possible to intuitively realize that the movement of the map will end. Additionally, it is possible to reduce the possibility that a sense of discomfort occurs when the moving map M is suddenly stopped.

The display control section acquires a starting scale that is a scale of the map when the destination is specified and an ending scale that is a scale of the map which allows the entire proposed travel route to be displayed. Then, the display control section gradually changes a scale of the map displayed on the display section from the starting scale to the ending scale during a movement period, in which the position of the map displayed on the display section gradually moves from the starting position to the ending position. Thus, it is possible to suppress the scale of the map from changing suddenly and the transition of the position of the map is easily understood. If the scale of the map is changed suddenly, the possibility that the user cannot easily recognize the transition of the position of the map increases even if the position of the map is not suddenly moved.

The display control section may set the length of the movement period, in which the position of the map displayed on the display section is gradually moved from the starting position to the ending position, so that the larger the difference is between the starting scale and the ending scale, the longer the movement period is. Thus, by increasing the length of the movement period when the rate of change of the scale increases, it is possible to suppress the scale of the map from changing suddenly and the transition of the position of the map is easily understood.

In the starting part of the movement period, in which the position of the map displayed on the display section is gradually moved from the starting position to the ending position, the display control section may gradually increase a speed at which the scale of the map is changed. Thus, it is possible to suppress the scale of the map from changing suddenly and the transition of the position of the map is easily understood.

In the last part of the movement period, in which the position of the map displayed on the display section is gradually moved from the starting position to the ending position, the display control section may gradually decrease the speed at which the scale of the map is changed. In such a configuration, noticing that the rate of change of the scale of the map is decreasing makes it possible to intuitively realize that the movement of the map is terminated. Additionally, it is possible to reduce the possibility that a sense of discomfort occurs due to the change of the scale of the map stopping suddenly.

Additionally, the technique of gradually moving the map from the starting position, which is the position of the map when the destination is specified, can be applied as a program or a method. There are cases in which the system, the program, and the method stated above are implemented as an independent device or are implemented using parts in common with sections provided in the vehicle. The system, the program, and the method stated above include various forms. For example, navigation systems, map display systems, methods, and programs that include the device described above can be provided. Various changes may also be made. For example, part of the system may be implemented using software, and part of the system may be implemented using hardware. The various aspect of the application may be implemented as a recording medium of a program that controls the device. The recording medium for the software may be a magnetic recording medium or a magneto-optical recording medium. The same applies to any recording medium that will be developed in the future.

10 ... Navigation system, 20 ... Control unit, 21 ... Navigation program, 21a ... Destination acquiring module, 21b ... Position acquiring module, 21c ... Display control module, 30 ... Recording medium, 30a ... Map information, 30b ... Route information, 41 ... GPS reception section, 42 ... Vehicle speed sensor, 43 ... Gyro sensor, 44 ... User I/F section, B1 ... Destination setting button, C ... Cursor, G ... Destination, H ... line of movement, M ... Map, P ... Reference position, PE ... Ending position, PI ... Starting position, R ... Denominator of scale, S ... Departure point, T ... Movement period, TE ... Ending period, TI ... Starting period, TK ... Intermediate period, W ... Map display region, X ... Ending distance, Y ... Proposed travel route, Z ... Ending ratio, x ... Distance, z ... Ratio.

The invention claimed is:

1. A map display system comprising:
   a destination acquiring section which acquires a destination specified on a map displayed on a display section;
   a position acquiring section which acquires a starting position that is a position of the map when the destination is specified and an ending position that is a position of the map which allows an entire proposed travel route that connects a departure point and the destination to be displayed; and
   a display control section which controls the display section so that the position of the map displayed on the display section gradually moves from the starting position to the ending position, which acquires a starting scale that is a scale of the map when the destination is specified and an ending scale that is a scale of the map which allows the entire proposed travel route to be displayed, and which gradually changes a scale of the map displayed on the display section from the starting scale to the ending scale during a movement period, in which the position of the map displayed on the display section gradually moves from the starting position to the ending position,
   wherein the starting position is a center point on the display when the destination is specified, the ending position is a center point on the display when the entire proposed travel route is displayed and the ending position is different from the destination.

2. The map display system according to claim 1, wherein the display control section sets a length of the movement period, in which the position of the map displayed on the display section gradually moves from the starting position to the ending position, so that the longer a distance is from the starting position to the ending position, the longer the movement period is.

3. The map display system according to claim 1, wherein the display control section gradually increases a moving speed of the map in a starting part of the movement period, in which the position of the map displayed on the display section gradually moves from the starting position to the ending position.

4. The map display system according to claim 1, wherein the display control section gradually decreases a moving speed of the map in a last part of the movement period, in which the position of the map displayed on the display section gradually moves from the starting position to the ending position.

5. The map display system according to claim 1, wherein the display control section sets the length of the movement period, in which the position of the map displayed on the display section gradually moves from the starting position to the ending position, so that the larger a difference is between the starting scale and the ending scale, the longer the movement period is.

6. The map display system according to claim 1, wherein the display control section gradually increases a changing speed of the scale of the map in the starting part of the movement period, in which the position of the map displayed on the display section gradually moves from the starting position to the ending position.

7. The map display system according to claim 1, wherein the display control section gradually decreases a changing speed of the scale of the map in the last part of the movement period, in which the position of the map displayed on the display section gradually moves from the starting position to the ending position.

8. A non-transitory computer readable medium storing a map display program which causes a computer to function as:
   a destination acquiring section which acquires a destination specified on a map displayed on a display section;
   a position acquiring section which acquires a starting position that is a position of the map when the destination is specified and an ending position that is a position of the map which allows an entire proposed travel route that connects a departure point and the destination to be displayed; and
   a display control section which controls the display section so that the position of the map displayed on the display section gradually moves from the starting position to the ending position, which acquires a starting scale that is a scale of the map when the destination is specified and an ending scale that is a scale of the map which allows the entire proposed travel route to be displayed, and which gradually changes a scale of the map displayed on the display section from the starting scale to the ending scale during a movement period, in which the position of the map displayed on the display section gradually moves from the starting position to the ending position,
   wherein the starting position is a center point on the display when the destination is specified, the ending position is a center point on the display when the entire proposed travel route is displayed and the ending position is different from the destination.

* * * * *